Inventor:
Karl Heinz Wessel

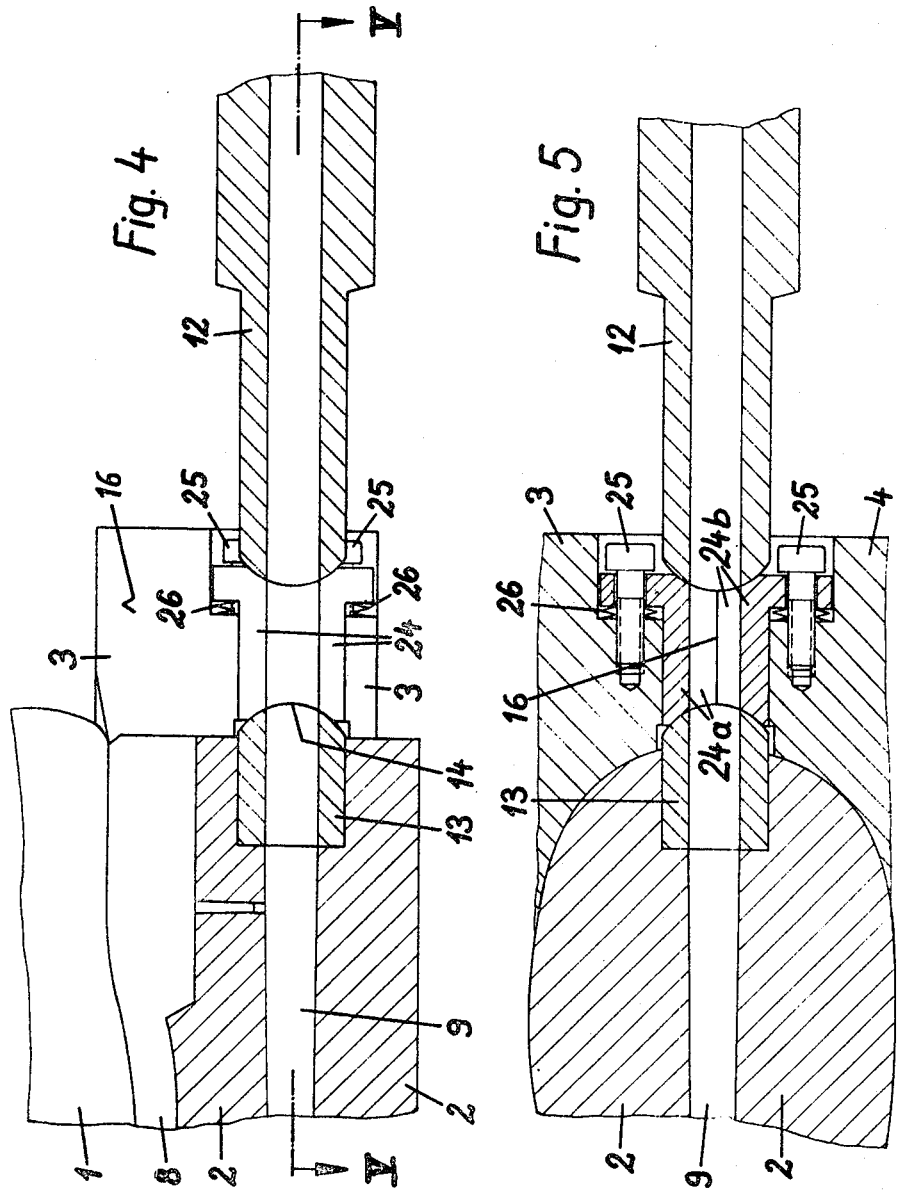

United States Patent Office 3,467,985
Patented Sept. 23, 1969

3,467,985
APPARATUS FOR INJECTION MOLDING OF SOLES ONTO THE BODIES OF FOOTWEAR
Karl Heinz Wessel, Vlotho (Weser), Germany, assignor to Friedrich Stubbe, Vlotho (Weser), Germany
Filed Nov. 10, 1966, Ser. No. 593,545
Claims priority, application Germany, Nov. 25, 1965, St 24,689
Int. Cl. B29f 1/00; A43d 65/02
U.S. Cl. 18—30                                                7 Claims

ABSTRACT OF THE DISCLOSURE

Apparatus for injection molding of soles of resilient material longitudinally of a footwear body optionally from heel and toe ends by means of a multi-part mold including a sole plate, a last and side walls movable to embrace and laterally surround the sole plate. The sole plate longitudinally and directly has a sprue gate and sprue passage means with bores to a sole-defining chamber being supplied with injection material. An opening coaxial with the sprue gate and sprue passage means is formed by the side walls in a parting line therebetween and a tubular means fits into this coaxial opening for receipt of the injection material from a nozzle complementary thereto. A yieldable means biases the tubular means axially of the opening in the side walls in a direction toward the engageable nozzle and away from the sprue gate and sprue passage means.

---

The present invention relates to an apparatus for injection molding soles of synthetic material or rubber onto the upper or body portion of footwear. It is known for this purpose to employ a multi-sectional form or mold which comprises a sole plate, a last, and lateral wall members or jaws movable toward and away from each other. The last, which carries the body of a shoe, may be adapted to be lifted, raised or turned relative to the sole plate in order to permit an easy mounting of the body of the shoe and an easy withdrawal of the finished shoe with the sole injection molded thereon. Also the sole plate may be movable and adjustable relative to the last in order to permit a variation in the distance between the last and the sole plate. The hollow space of the form which is defined in upward and downward direction by the last and the sole plate is laterally closed by the said lateral side wall members which are adapted tightly to engage the sole plate as well as the last and the body of the shoe clamped thereto and which can be moved relative to each other for purposes of opening the form. The parts of the form are arranged in a form-closing unit which is equipped with means such as hydraulic cylinders for moving the mold parts. The injection of the synthetic material or rubber into the form is effected by an injection unit the injection nozzle of which is in its position of injection connected with a feed head or sprue passage leading into the hollow space of the form. If desired, also a plurality of forms may be mounted for instance on a turntable and may successively be moved in front of the injection molding unit.

The sprue gate or opening of the feed head or sprue passage is arranged at the heel end or also at the toe end of the form. This means that the injection is effected through the parting or separating line between the two lateral wall members or jaws. This aims on one hand at a flow path as short as possible in the hollow space in the form and on the other hand at a safe filling of the form or mold, especially when employing rubber. At the longitudinal sides of the mold there are also provided devices, for instance, hydraulic cylinder piston systems for actuating the side walls which do not permit or make difficult the mounting of lateral feed heads. Therefore, the sole plate is provided with a feed head or sprue passage extending in the longitudinal direction of the sole plate, said passage leading into the hollow space of the form through openings or branch passages distributed over the length of said passage. The feed passage continues in the side walls, i.e. in the separating line between the side wall members, and the feed head opening located in the surface of the side wall members is provided with a sealing surface adapted to be engaged by the sealing surface of the injection nozzle of the injection unit.

The above outlined devices, however, have various drawbacks. Thus, the side walls move vertically or at least approximately vertically toward the longitudinal sides of the sole plate, and the side walls move also at their separating line perpendicularly toward each other so that at all of these areas a sufficient seal is to be established while a corresponding pressure is exerted upon the said side walls. At the heel end and at the toe end of the sole plate, the parts of the side walls which extend around the heel end and the toe end of the sole plate, move tangentially or nearly tangentially relative to the sole plate so that at these areas it is impossible to obtain the same pressure as on the other above mentioned areas. Consequently, considerable difficulties are encountered with regard to the obtainment of a proper seal where that portion of the feed head passage which is located in the sole plate merges with that portion of the feed head passage which is located in the separating line or gap of the side walls. In view of the relatively high injection molding pressures, it is, therefore, unavoidable that injection material escapes from the feed head passage into the separating plane between the sole plate and the side walls and forms skins which have to be cut off from the injection molded shoe sole.

It is, therefore, an object of the present invention to provide an apparatus for injection molding soles onto a shoe body, which will overcome the above mentioned drawbacks.

It is another object of this invention to provide an apparatus as set forth above, which by simple and low cost means will safely and reliably solve the problem of effecting a good seal also at high injection molding pressures.

These and other objects and advantages of the invention will appear more clearly from the following specification in connection with the accompanying drawings, in which:

FIG. 4 is a vertical longitudinal section of still another embodiment of the arrangement of FIG. 2.

FIG. 5 is a cross section of FIG. 4 taken along the line V—V thereof.

The objects underlying the present invention have been realized according to this invention primarily in that the sprue gate or inlet opening of the feed head or sprue passage is arranged directly on the sole plate, and that the lateral walls or jaws at their separating line will when the mold is closed form an opening which is coaxial with the feed head or sprue passage. When the assembly is in its injection molding position, a tubular connecting means extends through said opening and establishes communication between the injection nozzle and the feed head or sprue passage while engaging said sprue gate or inlet opening in a sealing manner. In this way, it will be assured that a sprue gate or inlet opening is formed on the sole plate, i.e. a sealing surface against which the tubular connection which extends between the side walls can be firmly and tightly pressed. The said tubular connection can be tightly connected with the injection nozzle in various ways as will be described further below in connection with specific embodiments. As a result thereof, an absolutely tight connection between the injection unit and the feed head or sprue passage in the sole plate is created in a simple and inexpensive manner so that also at high injection pressures practically nowhere injection molding material can escape.

Figure 1:
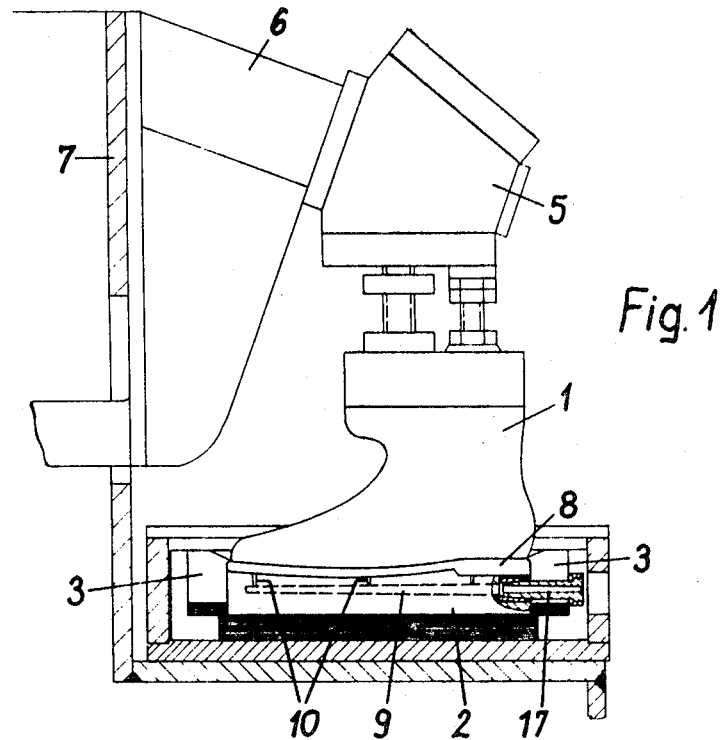
FIG. 1 shows an apparatus according to the invention partly in side view and partly as a vertical longitudinal section.

Referring now to the drawings in detail and FIG. 1 thereof in particular, the latter illustrates the mold closing unit in connection with a multi-sectional mold comprising a last 1, a sole plate 2, and two side walls 3 and 4 (FIGS. 1 and 5). Last 1 upon which the shoe body is mounted is arranged on a turret head 5 which is rotatable about an approximately horizontal or inclined axis and is mounted on a carriage 6. Carriage 6 is vertically movable on dove-tailed guiding means supported by a machine frame portion 7. The turret head 5 and the carriage 6 may be of any standard design e.g. of the type disclosed in Austrian Patent No. 199,543 and German Patent No. 1,151,200. In this way, last 1 can be lifted for opening the mold, can be turned for mounting the body of the shoe and withdrawing the finished shoe, and when the mold is closed can be pressed in any suitable manner, e.g. hydraulically or pneumatically against the upper edges of the side walls 3 and 4 at a pressure required for obtaining the proper seal. The edge of the shoe body is located between the last 1 and the side walls 3, 4. The side walls 3 and 4 are movable relative to each other by any standard means, e.g. hydraulic or pneumatic means, and when opening the mold for removing the finished shoe are moved away from each other, whereas when closing the mold are pressed against the longitudinal sides of last 1 and sole plate 2, in which instance said side walls 3 and 4 extend around the heel end and the toe end of last 1 and sole plate 2 (FIG. 5).

Last 1, sole plate 2, and side walls 3, 4 together define the hollow space 8 in the mold into which extend the edges of the shoe body and which has the contour of the sole to be injected onto the shoe body. The sole plate 2 is provided with a feed head or sprue passage 9 extending in the longitudinal direction of plate 2. The material for the sole is injected into said passage 9 from the heel end. The said passage 9 leads into chamber 8 through a plurality of bores 10 distributed over the length of said passage 9.

Figure 3:
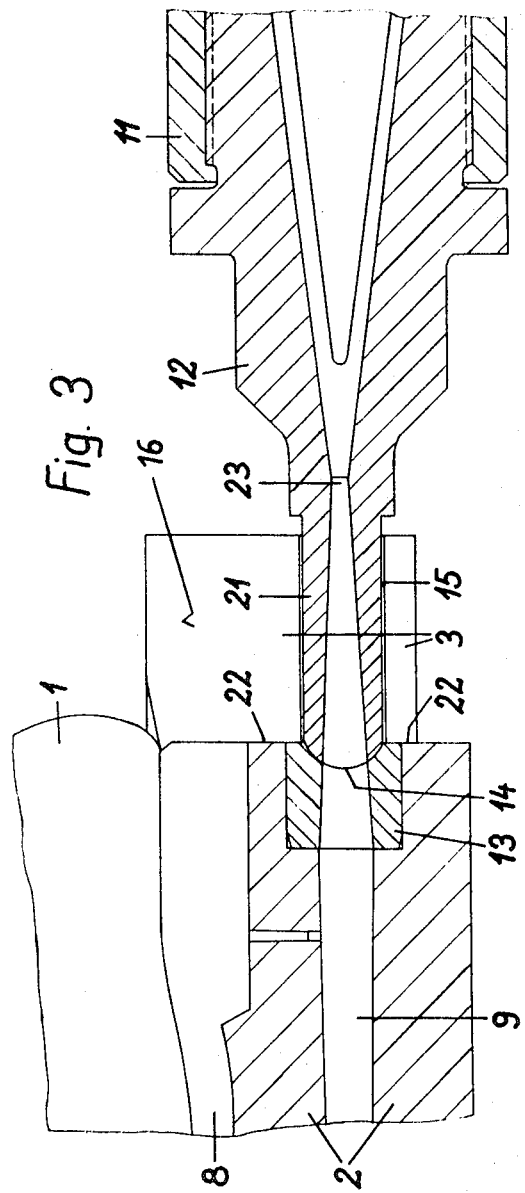
FIG. 3 shows a section similar to that of FIG. 2 of a modification of the present invention.

Referring now to FIG. 3, the right-hand portion thereof is a part of an injection unit known per se, and, more specifically, represents the front end of the injection cylinder 11 with the injection nozzle 12 which latter is adapted to be moved into its injection position in engagement with mold portions 1, 2, 3 and 4 and also adapted to be moved away from said mold portions.

Figure 2:
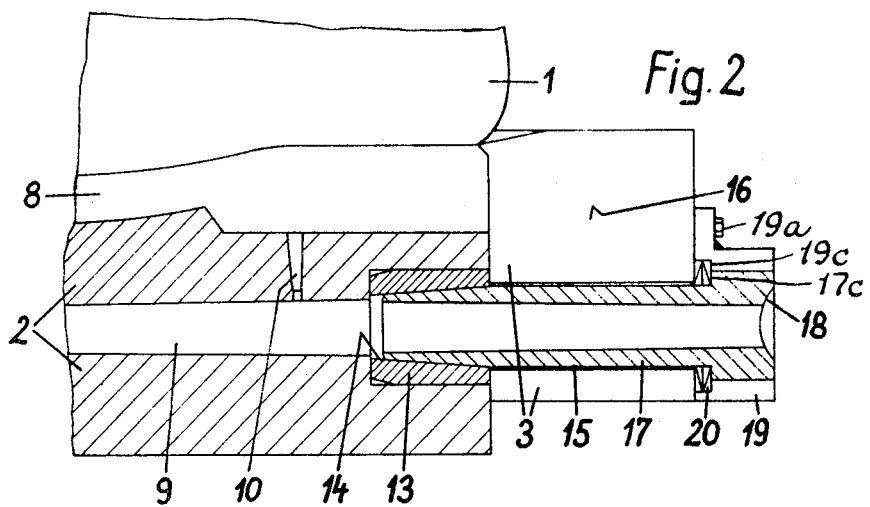
FIG. 2 illustrates on a larger scale than that of FIG. 1 the lower right-hand portion adjacent the heel portion of the shoe body of FIG. 1.

With the embodiment according to FIGS. 1 and 2, the sprue gate or inlet opening on the sole plate 2 is formed by a bushing 13 which is firmly inserted in passage 9 and is provided with a conical opening 14. The side walls 3 and 4 have those surfaces thereof which face each other provided with semicircular depressions which when the mold is closed form an opening 15 in the gap 16 between the side walls 3 and 4, said opening 15 being coaxial with the passage 9. A tubular connecting member 17 passes through the opening 15 of the side walls and has a conical end portion which extends into the conical sprue gate opening 14. The other end of the tubular connecting member 17 is provided with an opening 18 having a spherical sealing surface for an injection nozzle with a correspondingly shaped tip 21a (FIG. 3). This end of the tubular connecting member 17 is guided in a divided centering body 9 with a cutout 19c complementary to a collar 17c of member 17 seating dish springs 20, said body 19 being connected to the side walls 3 and 4, e.g. by screws 19a. When the injection nozzle of the injection unit occupies its injecting position, the injection nozzle is pressed upon the sealing surface of opening 18 so that a tight connection of the injection nozzle with the tubular connecting member 17 is established. In this way, simultaneously the conical end of the tubular connecting member 17 is, against the thrust of the dish springs 20, pressed into the conical sprue gate opening 14 so that a tight connection is established between the tubular connecting member 17 and the sprue passage 9 of the sole plate 2. When after completion of the injection operation, the mold is opened and the last one is lifted, the injected mass which has hardened in the bores 10 will tear off directly at the passage 9 because the bores 10 taper toward the passage 9, and the stoppers formed by the material are pulled out from the bores 10 by the shoe sole and later cut off. The sprue strand hardened in the sprue passage 9 and the connecting member 17 will when lifting off the injection nozzle tear off from the opening 18 or in the nozzle. At the same time, the connecting member 17 is moved away by the dish springs 20 from the conical sprue gate opening 14. After the side walls 3 and 4 during the opening of the mold have been moved away from each other, the connecting member 17 can be removed from the opening 14. The sprue strand can be either pulled out from the sprue passage 9 and subsequently be removed from the connecting member 17 or the said sprue strand will itself pull out from the connecting member 17 and can then subsequently be pulled out of the passage 9.

With the embodiment of FIG. 3, the tubular connection extending through the opening 15 of the side walls 3 and 4 is formed by an extension 21 of the injection nozzle 12. The bushing 13 of the passage 9 has a sprue gate or inlet opening 14 with a spherical sealing surface against which the tubular extension or member 21 having a corresponding spherical tip is pressed in a sealing manner so that no injection material can penetrate into the joint or gap 22 between the sole plate and the side walls 3, 4. The flowthrough passage of the injection nozzle 12 has a restriction 23 at which the hardened sprue strand will separate from the still plastic injection mass in the nozzle 12 so that when the latter is lifted off the mold, the sprue strand will be pulled out of the passage of the tubular extension 21 and after the opening of the side walls 3, 4 can likewise be pulled out of the sprue passage 9.

The embodiment according to FIGS. 4 and 5 shows a tubular connecting member 24 which is similar to the connecting tube 17 according to FIG. 2. The connecting pipe 24 seals at one end thereof with the spherical sealing surface of the sprue gate or inlet opening 14 in bushing 13 of sprue passage 9 while its other end seals with the spherical tip of the injection nozzle 12. The connecting pipe 24 is by means of the injection nozzle 12 pressed against the sprue gate or inlet opening 14 against the thrust of dish springs 26 so that after the injection nozzle 12 has been lifted off, the connecting pipe 24 is in its turn moved away from the sprue gate or inlet opening 14 by springs 26. The connecting pipe 24 is formed of two parts of which part 24a is by means of screws connected to the side wall 3 whereas its part 24b is connected by screws 25 to the side wall 4. Parts 24a and 24b are movable on said screws 25 in axial direction thereof. Therefore, when opening the mold, also the connecting pipe 24 is divided by the side walls 3, 4 moving away from each other so that the sprue strand can be easily grasped and be pulled out from the passage 9.

It is, of course, to be understood that the present invention is, by no means, limited to the particular embodiments shown in the drawings but also comprises any modifications within the scope of the appended claims.

What I claim is:

1. An apparatus for injection molding soles, especially of rubber and synthetic material, onto a shoe body, which includes: a multi-part mold operable to be closed and opened and comprising a last adapted to receive the shoe body onto which a sole is to be injection molded, two side walls movable toward and away from each other, and a sole plate which in closed position of said mold together with said side walls and a shoe body placed on said last defines a chamber corresponding in shape to the sole to be injection molded onto said shoe body, said sole plate directly being provided with sprue gate and sprue passage means extending in the longitudinal direction of said sole plate and also being provided with bores for establishing communication between said sprue passage means and said chamber, said side walls which embrace and laterally surround said sole plate in closed condition of said mold defining along their separating line an opening substantially coaxial with said sprue gate and sprue passage means, and tubular means received in said coaxial opening and axially shiftable into direct engagement with said sprue gate and sprue passage means of said sole plate for conveying molding material from an injection nozzle directly and longitudinally into said sprue gate and sprue passage means.

2. An apparatus according to claim 1 in which said tubular means extends detachably through said coaxial opening into said sprue gate and sprue passage means and at that end thereof which is remote from said sprue passage means said tubular means is provided for sealingly receiving the mouth of an injection nozzle, and yieldable means continuously urging said tubular means in a direction away from said sprue gate and sprue passage means.

3. An apparatus according to claim 1, in which said tubular means extends detachably through said coaxial opening in said sprue gate and sprue passage means and at that end thereof which is remote from said sprue passage means said tubular means is provided for sealingly receiving the mouth of an injection nozzle, and in which that end of said tubular means which is remote from said sprue gate and sprue passage means is provided with a collar, and spring means interposed between said collar and the respective adjacent end face portion of said side walls, and means retaining said spring means on said side walls.

4. An apparatus according to claim 1, which includes a two-part tubular means split in the longitudinal direction thereof and axially slidable in said opening defined by said side walls in closed condition of said mold, connecting means axially movably connecting said tubular means to said side walls, and spring means interposed between said side walls and said tubular means and continuously urging the latter in a direction away from said sole plate, said tubular means being movable against the thrust of said spring means toward said sole plate to establish tight communication between the interior of said tubular means and said sprue passage means.

5. An apparatus according to claim 4, which includes a bushing mounted on said sole plate substantially coaxially with and at that end of said sprue passage means which is adjacent said tubular means, those end faces of said bushing and said tubular means which face each other being provided with matching complementary surfaces for tight engagement with each other.

6. An apparatus according to claim 4, in which that end face of said tubular means which faces away from said sole plate is provided with a contour surface for engagement with a corresponding complementary contour surface of an injection nozzle.

7. An apparatus according to claim 1, which includes an injection nozzle, and wherein said tubular means is a tubular extension in one piece with said injection nozzle and extends longitudinally through said coaxial opening formed by said side walls in and sealingly engages directly said sprue gate of said sole plate.

References Cited
UNITED STATES PATENTS

| | | | |
|---|---|---|---|
| 2,418,856 | 4/1947 | Stacy | 18—30 |
| 2,499,565 | 3/1950 | Booth. | |
| 2,821,750 | 2/1958 | Huelskamp | 18—30 |
| 3,109,199 | 11/1963 | Hardy. | |
| 3,110,061 | 11/1963 | Hardy | 18—30 |
| 3,131,432 | 5/1964 | Battell et al. | 18—30 |
| 3,134,141 | 5/1964 | Hardy | 18—30 |

J. HOWARD FLINT, Jr., Primary Examiner

U.S. Cl. X.R.

18—42